United States Patent
Viola et al.

[11] Patent Number: 5,593,014
[45] Date of Patent: Jan. 14, 1997

[54] CLUTCH MODULE WITH A PERIPHERALLY THICKENED PRESSURE PLATE

[75] Inventors: Paolo Viola, Paris; Michelle Sevennec, St. Gemme, both of France

[73] Assignee: Valeo, Paris, France

[21] Appl. No.: 446,599

[22] Filed: May 24, 1995

[30] Foreign Application Priority Data

Sep. 24, 1993 [FR] France ................................ 93 11386

[51] Int. Cl.[6] .................................................. F16D 13/18
[52] U.S. Cl. ..................... 192/70.18; 192/70.14; 192/89.23
[58] Field of Search ............................. 192/70.18, 70.14, 192/89.23, 89.24

[56] References Cited

U.S. PATENT DOCUMENTS

| | | | |
|---|---|---|---|
| 2,217,529 | 10/1940 | Spase | 192/70.14 |
| 3,749,213 | 7/1973 | Maucher | 192/70.18 X |
| 4,057,131 | 11/1977 | Floton | 192/70.13 |
| 4,566,573 | 1/1986 | Lane, Jr. | 192/70.18 |

FOREIGN PATENT DOCUMENTS

| | | | |
|---|---|---|---|
| 0183659 | 11/1955 | Austria . | |
| 0252600 | 1/1988 | European Pat. Off. . | |
| 2546594 | 11/1984 | France . | |
| 3336158 | 4/1985 | Germany | 192/70.18 |
| 3422019 | 12/1985 | Germany . | |

Primary Examiner—Andrea L. Pitts
Attorney, Agent, or Firm—Longacre & White

[57] ABSTRACT

This relates to a clutch module of the kind comprising a mechanism (11), a clutch friction wheel (12), and a flywheel (13), the mechanism itself comprising a cover plate (14), a diaphragm (15) which engages on the cover plate (14), and a pressure plate (16A) on which the diaphragm (15) engages, while the flywheel (13) is constituted by a reaction plate (16) which is similar to the pressure plate (16A), together with a support plate (27) on which the cover plate (14) is fixed. According to the invention, the pressure plate (16A) is thicker at its outer periphery than at its inner periphery. Applicable to clutch modules, especially for motor vehicles.

6 Claims, 2 Drawing Sheets

CLUTCH MODULE WITH A PERIPHERALLY THICKENED PRESSURE PLATE

BACKGROUND OF THE INVENTION

1. Field of the Invention

This invention relates to clutch modules, especially for motor vehicles.

2. Description of Related Art

As is well known, a clutch module comprises, as a unit, a mechanism, a clutch friction wheel and a flywheel, with the mechanism itself comprising a cover plate having a side wall, a diaphragm which engages on the cover plate, and a pressure plate on which the diaphragm engages.

The invention is concerned more particularly with the case ill which, as is described for example in the document FR-A-2 546 594, the flywheel is constituted by a reaction plate which is similar to the pressure plate, and a support plate on which the cover plate of the mechanism is secured.

One of the problems to be overcome in the manufacture of clutch modules of this type is to obtain, for a given diametral size and/or total weight, a maximum inertia in order to increase the ability to absorb cyclic irregularities in the rotating mode.

An object of the invention is to provide a clutch module in which this inertia is optimised in a very simple manner, and which also has other advantages. This clutch module, which is of the above type, is characterised in that the pressure plate is thicker at its outer periphery than at its inner periphery, and in that the pressure plate and the reaction plate have from place to place, in slots formed locally in at least the side wall of the cover plate, radial peripheral lugs to which circumferentially elongated tongues are attached by fastening means, with the peripheral edge of the pressure plate extending over a circumference, the diameter of which is greater than the diameter of the circumference on which the fastening means for the tongues are located.

In this way, the inertia can be increased for a given diametral size, and the centre of gravity of the transverse cross section of the pressure plate is beneficially moved radially towards the outer periphery, to the benefit of its inertia.

The same is clearly true for the reaction plate, having regard to its similarity to the pressure plate.

Consequently, for a given inertia, the diametral size can beneficially be reduced. In order to reduce this diametral size still further, according to the invention the diameter of the circumference on which the fastening means for the tongues are located is smaller than the internal diameter of the side wall of the cover plate, and the tongues extend radially close to the outer portion of the clutch friction wheel.

The said tongues extend over an arc of a circle in order to reduce the size.

The similarity between the reaction plate and the pressure plate also leads to advantageous simplification of manufacture.

The features and advantages of the invention will appear more clearly from the description that follows, given by way of example and with reference to the attached diagrammatic drawings, in which:

DETAILED DESCRIPTION OF PREFERRED EMBODIMENT

Figure 1:
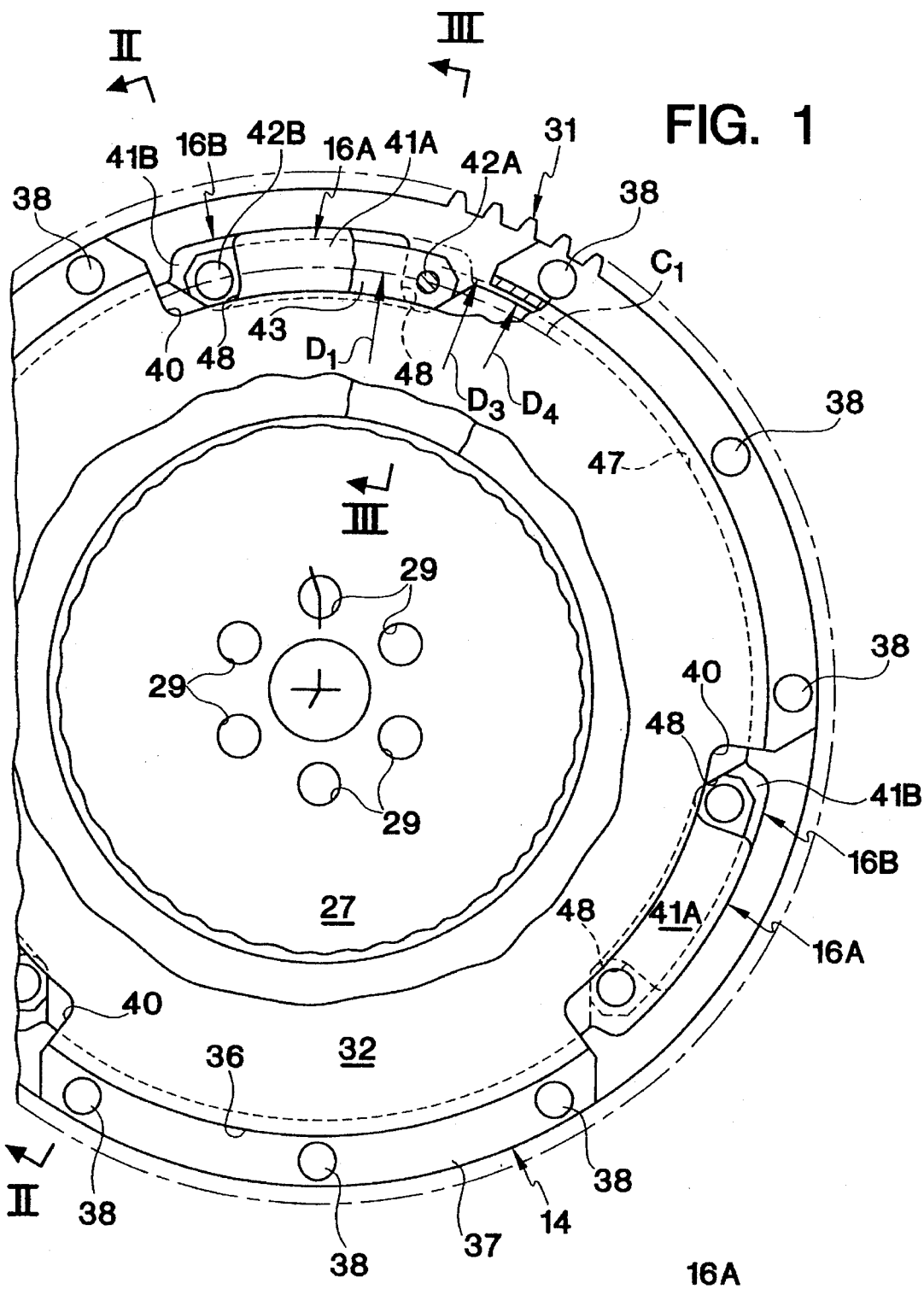
FIG. 1, in which parts are cut away locally, is a partial view in elevation of a clutch module in accordance with the invention, in the direction of the arrow I in FIG. 2.
Figure 4:
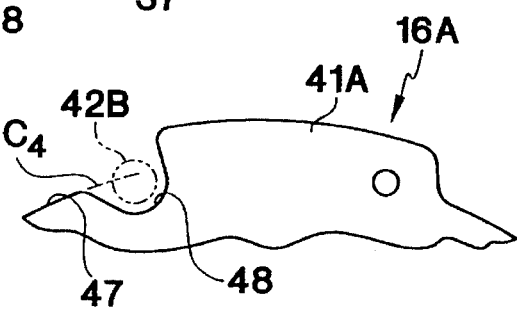
FIG. 4, which is derived from FIG. 1, is a partial view in elevation of the pressure plate employed in this clutch module.

As shown in the drawings, the clutch module 10 in accordance with the invention comprises, in axial succession and in a manner known per se, a mechanism 11, a clutch friction wheel 12 and a flywheel 13.

The mechanism 11 itself comprises, in axial succession, a cover plate 14, a diaphragm 15 which bears on the cover plate 14, and a pressure plate 16A on which the diaphragm 15 is engaged.

In this example, the mechanism 11 is of the "push to release" type, and the diaphragm 15 accordingly engages sideways on the cover plate 14 at that one of the peripheries of its peripheral portion 18, defining a Belleville ring, that has the smallest diameter, while it engages on the pressure plate 16A sideways at the periphery of the latter that has the largest diameter.

Under the biassing force of the diaphragm 15, the pressure plate 16A is adapted to clamp against the flywheel 13 the friction disc 19, having friction liners 20, which is part of the clutch friction wheel 12.

Figures 2, 3:
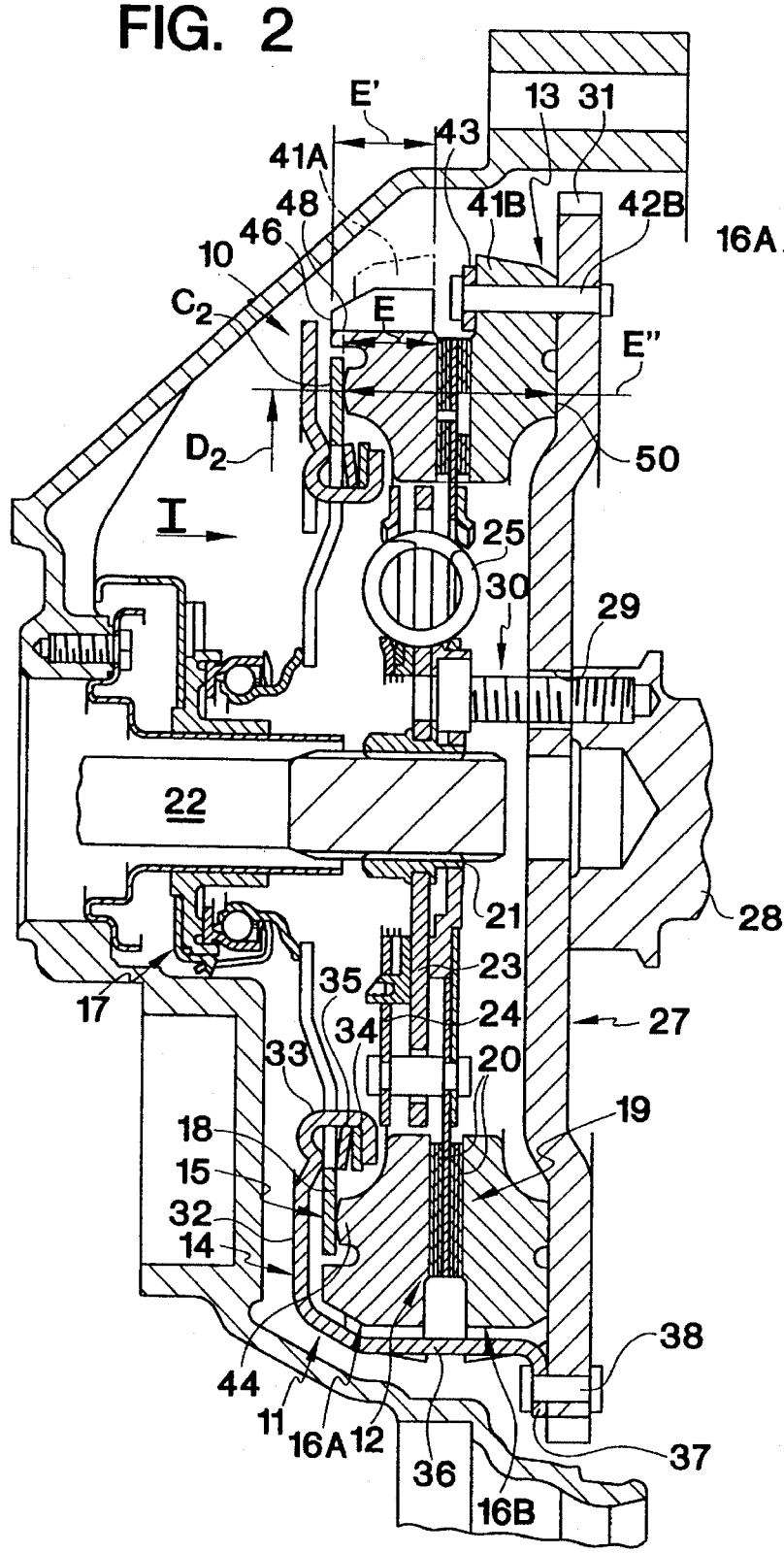
FIG. 2 is a view in axial cross section of the module fitted in place, taken on the broken line II—II in FIG. 1.
FIG. 3 is a partial view in axial cross section taken on the line III—III in FIG. 1.

For disengagement of the friction disc 19, a clutch release bearing 17, which is shown in FIG. 2 in fine lines, acts in a thrust mode on the fingers of the diaphragm 15 at the ends of the latter.

In this example, the clutch friction wheel 12 has a hub mounted damper.

Besides a hub 21 through which it is adapted to be mounted in rotation on a driven shaft 22, which in this case is the output shaft of a gearbox, and a damper plate 23 which is fixed to the hub 21, it includes two guide rings 24, each of which extends respectively on either side of the damper plate 23, and to which the friction disc 19 is secured, with, interposed circumferentially between the damper plate 23 and these guide rings 24, circumferentially acting resilient means which, in this example, comprise springs 25 of the coil spring type, each of which is individually housed partly in a window of the damper plate 23 and partly in windows of the guide rings 24.

As to the flywheel 13, this comprises, firstly a reaction plate 16B which is similar to the pressure plate 16A and against which the friction disc 19 engages, and secondly, a support plate 27 which in this example is of steel, and on which the cover plate 14 of the mechanism 11 is fixed, and through which the assembly, that is to say the clutch module 10 considered as a unit, is adapted to be carried on a driving shaft 28 which in this case is the crankshaft of an internal combustion engine.

In this example the plates 16A, 16B are castings, while the support plate 27 has a plurality of through holes 29 spaced apart on a circle, for accommodating studs that provide the necessary fastening.

At its periphery it has a set of teeth 21 defining a starter crown. In this example, the cover plate 14 includes a transverse, annular base portion 32 which provides an abutment for the peripheral portion 18 that defines the Belleville ring of the diaphragm 15 on a first side of the latter, and from which there project lugs 33 on which the said peripheral portion 18 is engaged, on the other side of the diaphragm and through an interposed spacing ring 34 and a resilient ring 35. The cover plate 14 also has an axial side wall 36 which is generally cylindrical, with a circular contour in transverse cross section, by means of which it encloses, in succession, the pressure plate 16A, the friction disc 19 and the reaction plate 16B. Finally, it includes, extending transversely in a direction radially away from the base portion 32, a flange 37 by which it is secured to the support plate 27, by means of rivets 38 in this example. The pressure plate 16A and the reaction plate 16B are provided from place to place, in slots 40 which are formed locally in at least the side wall 36 of the cover plate 14, with peripheral lugs 41A, 41B which extend radially away from the axis of the assembly, and to which there are secured, by fastening means 42A, 42B described in more detail below, tongues 43 which are elongated circumferentially on a common pitch circle of the assembly, and which are deformable resiliently in the axial direction.

These tongues 43 accordingly have the shape of a segment of a circle in order to reduce the diametral size.

In this example there are three of the lugs 41A, 41B, and they are spaced apart by equal intervals of 120 degrees from each other on their pitch circle. These lugs 41A, 41B are annular in shape, and they project radially with respect to the wall 36.

In this example the corresponding slots of the cover plate 14 are formed in the side wall 36 of the latter, as well as in its flange 37.

They also extend into its base portion 32.

In this example the fastening means 42A securing the tongues 43 to the lugs 41A of the pressure plate 16A are rivets, and the same is true for the fastening means 42B which attach the same tongues 43 to the lugs 41B of the reaction plate 16B.

In a modification they may consist of bolts. In addition, the fastening means 42B in this example also secure the reaction plate 16B to the support plate 27.

The fastening means 42A, 42B extend in this example over a common circumference C1 having a diameter D1.

D2 is also the diameter of the circumference C2 over which the diaphragm 15 engages on the pressure plate 16A through its peripheral portion 18 that defines the Belleville ring.

For the purpose of this engagement the pressure plate 16A in this example has, at least from place to place, an annular bead 44 or band, the summit line of which, being an angled edge in this example, defines the circumference C2.

This bead 44 is in the present case divided circumferentially into 25 segments, in order to improve the ventilation of the assembly.

In a modification, it may be formed as a continuous circle. In accordance with the invention, the pressure plate 16A is thicker at its outer periphery than at its inner periphery.

More precisely, radially outside the circumference C2 with respect to the axis of the assembly, that is to say radially outside the circumference C2 along which the diaphragm 15 bears on the pressure plate 16A, the latter has at least locally a thickness E' measured axially, which is greater than its thickness E measured under the same conditions along the said circumference C2.

In this example, the bead 44 of the pressure plate 16A, on which the diaphragm 15 engages, is in an axially withdrawn position behind an annular bead 46 which is formed at its outer periphery and which is a continuous circle, at the root of the lugs 41A.

It is this bead 46 that has an axial thickness E', disregarding a slight clearance beyond the friction surface against which the friction disc 19 is engaged.

In this example the outer edge of the peripheral portion 18 that defines the Belleville ring of the diaphragm 15 extends in facing relationship with the bead 46 of the pressure plate 16A, and close to this bead 46 but at a slight distance from the latter, in order to avoid any interference with it.

In this example the diameter D1 of the circumference C1, along which the fastening means 42A, 42B of the tongues 43 are positioned, is smaller than the internal diameter D3 of the side wall 36 of the cover plate 14. In addition, the tongues 43 extend radially close to the peripheral portion of the clutch friction wheel 12, that is to say, more precisely, close to the outer peripheral portion of the friction disc 19 of the latter.

The general result that follows from the foregoing is that the assembly is very compact diametrally.

In other words, for a given inertia, the diametral size is reduced.

According to the invention, in this example, between two lugs 41A the peripheral edge 47 of the pressure plate 16A extends along a circumference C4, the diameter D4 of which is greater than the diameter D1 of the circumference C1 on which the fastening means 42A, 42B for the tongues 43 are located, while being clearly smaller than the internal diameter D3 of the side wall 36 of the cover plate 14.

For a given diametral size, the inertia of the pressure plate 16A is thus increased, so that the inertia of the reaction plate 16B is also increased.

However, in order to provide access to the fastening means 42B which secure the tongues 43 to the lugs 41B of the reaction plate 16B, the pressure plate 16A is formed with a slot 48 bounding each of its lugs 41A, at least on the circumferential side that corresponds to the latter.

Similarly, the reaction plate 16B also has slots 48.

Preferably, and as shown, the reaction plate 16B is in fact identical to the pressure plate 16A, the only difference being that the face 50 through which it is abutted on the support plate 27, which corresponds to the face of the pressure plate 16A on which the diaphragm 15 engages, is formed flush so as to enable it to lie flat against the support plate 27.

As will be noted, the bead 46 of the pressure plate 16A preferably protects the bead 44 from any shock, either radially or axially, especially during handling prior to fitting, since its thickness E' is greater than the thickness E of the bead 44. The engagement surface which is provided for the diaphragm 15 is thus beneficially protected.

During the fitting operation, in a first step assembly of the support plate 27, reaction plate 16B and the appropriate end of the tongues 43 is carried out, using rivets that constitute the fastening means 42B.

In a second step, and after the clutch friction wheel 12 has been inserted, the pressure plate 16A is fastened on to the other end of the tongues 43, using rivets that constitute the fastening means 42A.

The tongues 43 exert a return force on the pressure plate 16A towards the reaction plate 16B, so that the friction liners 20 of the friction disc 19 are then gripped between these latter.

At this stage, a sub-assembly is therefore formed, on which it is possible to measure the distance E" which extends axially on the circumference C2 between, firstly, the summit line of the bead 44 which defines the said circumference C2, and secondly, the internal face of the support plate 27.

As a function of this distance E", a cover plate 14 is selected which has the axial dimension that enables the diaphragm 15 to occupy a suitable axial position for the desired load to be exerted on the pressure plate 16A.

In a modification, a shim may be interposed between the flange 37 of the cover plate 14 and the support plate 27, for adjustment of this dimension As will also have been noted, the lugs 41A, 41B of the pressure and reaction plates 16A, 16B are preferably of large circumference, which facilitates the location, in these lugs 41A, 41B, of the holes that may be necessary in order to provide dynamic balancing of the assembly.

Consequently, this enables the centring pins which are conventionally provided between the reaction plate 16B and the support plate 27 to be eliminated, dynamic balancing being carried out on the assembly of the clutch module 10.

The axial size is also beneficially reduced in this way.

The invention is of course not limited to the embodiment described and shown, but embraces all modified embodiments.

In particular, instead of making use of lugs 33 projecting from the cover plate 14, the assembly means which pivotally connect the cover plate 14 to the diaphragm 15 may employ small bars, as is described for example in the document FR-A-1 524 350 (U.S. Pat. No. 3,499,512).

We claim:

1. A clutch module of the kind comprising a mechanism (11), a clutch friction wheel (12) and a flywheel (13), the mechanism (11) itself comprising a cover plate (14), a diaphragm (15) which bears on the cover plate (14) which has a side wall (36), and a pressure plate (16A) on which the diaphragm (15) engages, while the flywheel (13) comprises a reaction plate (16B) which is substantially comparable in shape to the pressure plate (16A), together with a support plate (27) on which the cover plate (14) is fixed, characterised in that the pressure plate (16A) and the reaction plate (16B) are thicker at their outer periphery than at its inner periphery, and in that the pressure plate (16A) and the reaction plate (16B) have from place to place, in slots (40) formed locally in at least the side wall (36) of the cover plate (14), radial peripheral lugs (41A, 41B) to which circumferentially elongated tongues (43) are attached by fastening means (42A, 42B), with the peripheral edge (47) of the pressure plate (16A) extending over a circumference (C4), the diameter (D4) of which is greater than the diameter (D1) of the circumference (C1) on which the fastening means (42A, 42B) for the tongues (43) are located.

2. A clutch module according to claim 1, characterised in that, radially outside the circumference (C2) along which the diaphragm (15) engages on it, the pressure plate (16A) has at least locally a thickness (E1) which is greater than its thickness (E) along the circumference (C2).

3. A clutch module according to claim 1, characterised in that the diameter (D1) of the circumference (C1) on which the fastening means (42A, 42B) are located is smaller than the internal diameter (D3) of the side wall (36) of the cover plate (14).

4. A clutch module according to claim 3, characterised in that the tongues (43) extend radially close to the outer periphery of the clutch friction wheel (12).

5. A clutch module according to claim 1, characterised in that the reaction plate (16B) is identical to the pressure plate (16A), except only that a face (50) through which the reaction plate (16B) abuts the support plate (27), and which corresponds to the face of the pressure plate (16A) on which the diaphragm (15) engages, has a flush configuration.

6. A clutch module according to claim 5, characterised in that, for the purpose of giving access to the fastening means (42B) which attach the tongues (43) to the lugs (41B) of the reaction plate (16B), the pressure plate (16A) has a slot (48) bounding each of its lugs (41A), on at least one circumferential side of these lugs.

\* \* \* \* \*